May 11, 1926.                                                      1,583,976
R. KAUCH ET AL
HYDRAULIC BRAKE SAFETY DEVICE
Filed July 17, 1924
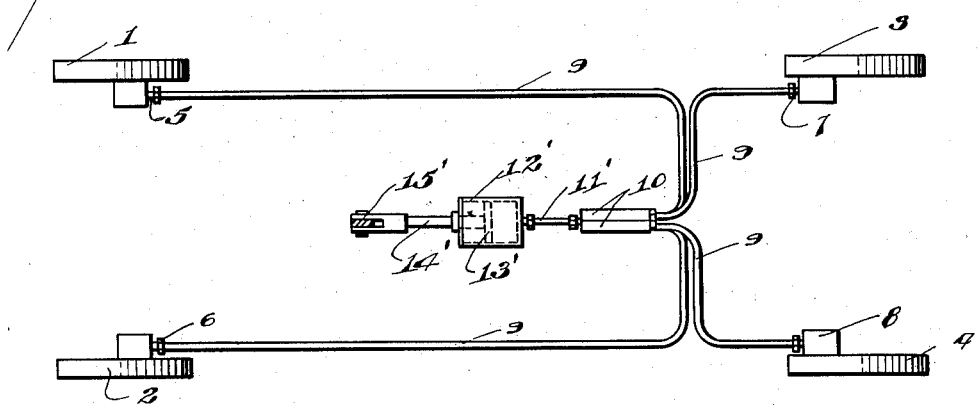
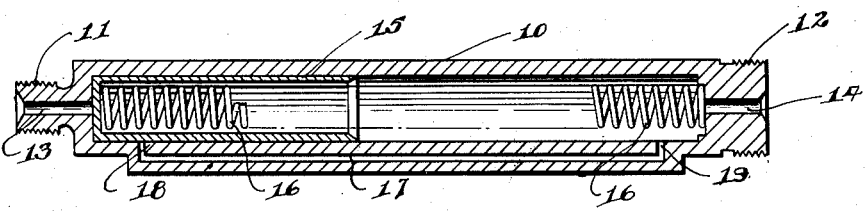
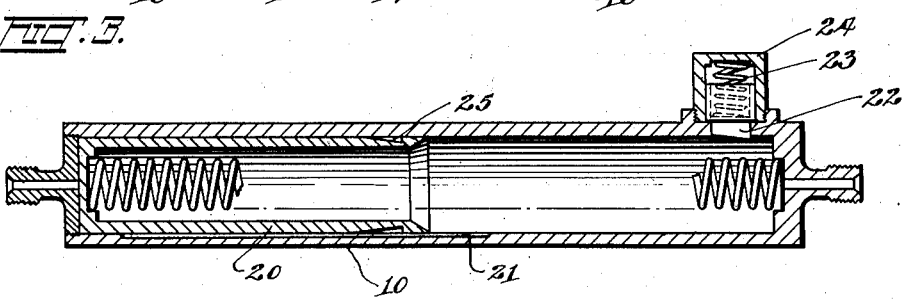
INVENTOR
Robert Kauch
Charles L. Paulus
BY
Robert A. Young
ATTORNEY Patented May 11, 1926.

1,583,976

UNITED STATES PATENT OFFICE.

ROBERT KAUCH AND CHARLES L. PAULUS, OF DAYTON, OHIO.

HYDRAULIC BRAKE SAFETY DEVICE.

Application filed July 17, 1924. Serial No. 726,549.

This invention relates to a safety device to provide means for isolating a portion of a hydraulic system from the remainder of the system, in case the part isolated has become damaged during usage so that a leakage of the fluid of the system would result.

The primary object of the invention is the provision of a means for isolating one portion of a hydraulic system by utilizing a pressure cylinder and the piston operable therein so that the piston will transmit the forces from one part of the system to the other under ordinary working conditions, but will automatically serve to isolate that portion of the system which it controls in the event of a break or leak in the pipes from other portions of the system controlled by it.

Further objects and advantages will be more fully set forth in the attached specification, in the claims and in the drawings, in which Fig. 1 is a diagrammatic view of a hydraulic brake system as applied to the four wheels of an automobile.

Fig. 2 is a longitudinal section of the automatically operating isolating device, and Fig. 3 is a longitudinal section of a modification thereof.

For purposes of illustration, the invention as shown in the drawings is applied to a hydraulic system as used on the four wheel brakes of an automobile, and in which one isolating device is used for each brake in order to automatically isolate one of the brakes in case it should become defective or broken, so that the leak of fluid out of the system would otherwise be entailed. Referring more particularly to the drawings by reference numerals, the four wheels of the automobile are designated 1 to 4 respectively, and each of the wheels is provided with a hydraulically operated braking device numbered 5 to 8 respectively. The hydraulic pressure is applied to these brakes through suitable pipes 9, each of which is connected to an isolated cylinder 10, these isolated cylinders being grouped together so that they may be connected to a single pipe 11' or through a series of multiple pipes to a master cylinder 12' containing a piston 13', connected to a rod 14' operated through a suitable hand operating lever 15' conveniently placed at the side of the driver of the vehicle. Operation of the hand lever 15' causes increase or decrease in the pressure supplied to the various parts of the system in order to operate the brakes. This force is transmitted to the various brakes through the individual cylinder blocks 10 in a manner which will be more fully described.

Referring to Fig. 2, the cylinder block 10 is provided at each end with an attaching means suitably threaded as shown at 11 and 12, by means of which the ends of the cylinder block may be attached to the pipe 9 leading to the brake and to the pipe 11' which leads to the master cylinder. A fluid passage 13 is provided in the attaching means 11 and leads to the inside of the cylinder block 10, a similar fluid passage 14 being provided in the opposite end of the cylinder block. The piston 15 is adapted to reciprocate within the cylinder and is normally held at one end of the cylinder in the position shown in Fig. 2 by means of a compression spring 16 which extends between the inside of the cylinder head and the remote end of the cylinder block. The application of pressure to the fluid in the passage 13 operates to force down the piston and compress the spring 16, thus transmitting the pressure to the passage 14 and to the brake. Under normal operation the travel of the piston 15 would be from the position shown in Fig. 2 to a position about midway of the length of the cylinder. When in the position to apply the braking force, it is desirable that any small leakage which may have occurred in the brake or in the pipes leading to it should be equalized by a supply of a small amount of fluid from other portions of the system. A supply tank, not shown, is ordinarily used for this purpose to supply a quantity of fluid to the master cylinder. This equalization takes place through a small restricted passage 17 extending from a point 18 near the end of the piston to a point 19 substantially removed from the other end of the piston. With the piston in its operating position part way down the cylinder, the passage 17 is uncovered at 18 and the fluid is permitted at this time to equalize by travelling slowly through the restricted passage 17 to the opposite end of the cylinder.

In case a break should occur which would form a considerable drain on the main supply of fluid and possibly rapidly exhaust the supply, the pressure supplied to the head of the piston would be much in excess of the opposing pressure on the opposite end of the piston and the piston would therefore immediately travel the full length of the cylinder, so as to close the passage 17 at the point 19 before sufficient time elapses for a leakage of the fluid through the passage 17 during the operation of the piston.

The preferred form of the device is shown in Fig. 3 in which it will be noted that the cylinder block 10 is provided with the piston 20 and the fluid in the system is permitted to equalize from one end of the piston to the other through the groove 21 extending longitudinally on one side of the piston in the cylinder wall. This groove is of a length slightly greater than the length of the piston and is positioned as shown so that the ends thereof will be opened when the piston is in a position slightly removed from its normal position, but will be closed when the piston is at either end of the cylinder. The passage 21 is open and effective only after the piston has been moved a certain amount to apply the braking force to the brakes, and at this time the fluid is permitted to equalize to take care of any small leakages which may have taken place. It is desirable that the groove 21 be so positioned relative to the piston location that the ends of the groove will be open only at a time when the brake is partially applied. A full application of the braking force is intended to move the piston about halfway to the remote end of the cylinder so that when travelling down long hills with the brake fully applied, it will be impossible for the fluid in the system to equalize since the by-pass is then closed. This will insure the application of full pressure to the piston and to the brakes and prevent the spring from moving the piston towards its normal position and cause a movement of the fluid through the by-pass, when such a movement is unnecessary and undesired.

In case of a severe leak or a break in that portion of the system leading to the particular brake controlled by the device, the piston would be moved the full length of the cylinder where it would be held by a latch 22 urged downwardly by the compression spring 23 which is suitably mounted in a housing box 24 on the end of the cylinder block. Latch 22 is adapted to engage in a notch 25 in the skirt of the piston, when the piston is in its position farthest removed from normal. Such action of the piston and the locking latch 22 operate to isolate one portion of the hydraulic system in case of a bad leak, without interfering with the operation of other portions of the system controlled by the same master cylinder.

We claim:

1. Means for automatically isolating a portion of a hydraulic system, comprising a cylinder, a piston operable therein, means for urging said piston to normal position adjacent one end of the cylinder, and a restricted by-pass in said cylinder to supply fluid from one end of the piston to the other, said by-pass having a length slightly exceeding the length of said piston and substantially less than the length of the cylinder, and located closer to said one end of the cylinder than the other, so that the by-pass will be closed when the piston is near either end position and also when the piston is a substantial distance away from said other end.

2. Means for automatically isolating a portion of a hydraulic system as set forth in claim 1 and a locking device for holding said piston at said other end of the cylinder.

3. Means for automatically isolating a portion of a hydraulic system comprising a cylinder, a piston longitudinally movable therein, means for urging said piston to normal position adjacent one end of the cylinder, a restricted by-pass in said cylinder to supply fluid from one end of the piston to the other when the piston is in a predetermined position, and a spring-pressed locking device for holding said piston in a position remote from normal.

4. In a hydraulic brake system, means for isolating one portion of the braking system from the remainder thereof, comprising a cylinder block, attaching means for each end thereof, a fluid passage in each attaching means leading to the cylinder, a piston in said cylinder operable longitudinally thereof, a compression spring urging said piston to a normal position at one end of the cylinder, said spring being located between the piston head and the remote end of the cylinder block, and a small groove in the side of said cylinder, the length of said groove being slightly greater than the length of the piston so that fluid may be slowly supplied from one end of the piston to the other, said piston being adapted to close an end of said by-pass when at either end of the cylinder and also when near the said remote end.

In testimony whereof we affix our signatures.

ROBERT KAUCH.
CHARLES L. PAULUS.